(12) United States Patent
Morgan

(10) Patent No.: US 8,155,625 B2
(45) Date of Patent: Apr. 10, 2012

(54) METHODS AND APPARATUS FOR CONSERVING ENERGY USED BY A MOBILE DEVICE

(75) Inventor: William Morgan, Wauconda, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 216 days.

(21) Appl. No.: 12/645,069

(22) Filed: Dec. 22, 2009

(65) Prior Publication Data

US 2011/0151944 A1    Jun. 23, 2011

(51) Int. Cl.
*H04W 88/02* (2009.01)
(52) U.S. Cl. .................................... 455/412.1
(58) Field of Classification Search ........... 709/204, 709/217, 224; 455/522, 412.1, 404.1, 466, 455/422.1, 550.1, 432.1, 67.11; 370/206, 370/315, 331, 335, 311, 328, 342
See application file for complete search history.

(56) References Cited

U.S. PATENT DOCUMENTS

| 7,323,970 | B1 * | 1/2008 | Murray et al. | ........... 340/426.12 |
| 7,539,160 | B2 | 5/2009 | Virtanen et al. | |
| 2007/0135080 | A1 | 6/2007 | Islam et al. | |
| 2007/0270140 | A1 | 11/2007 | Islam et al. | |
| 2008/0020808 | A1 | 1/2008 | Wang et al. | |
| 2009/0221277 | A1 | 9/2009 | Fomin et al. | |
| 2011/0122818 | A1 * | 5/2011 | Dwyer et al. | ................ 370/328 |
| 2011/0182220 | A1 * | 7/2011 | Black et al. | ................ 370/311 |

FOREIGN PATENT DOCUMENTS

| EP | 1798998 A1 | 6/2007 |
| EP | 1981224 A1 | 10/2008 |

OTHER PUBLICATIONS

Patent Cooperation Treaty, International Search Report and Written Opinion of the International Searching Authority for International Application No. PCT/US2010/058300, Feb. 28, 2011, 17 pages.

* cited by examiner

*Primary Examiner* — Diane Mizrahi

(57) ABSTRACT

Methods and apparatus are provided for saving energy in a mobile device configured to maintain a persistent communication session with an application server over a wireless network. A method comprises detecting a traffic pattern between a mobile device and an application server for maintaining a persistent communication session and automatically initiating a transition of the mobile device from a first operating state to a second operating state in response to detecting the traffic pattern. The power consumption associated with the second operating state is less than power consumption associated with the first operating state.

20 Claims, 2 Drawing Sheets

METHODS AND APPARATUS FOR CONSERVING ENERGY USED BY A MOBILE DEVICE

TECHNICAL FIELD

Embodiments of the subject matter described herein relate generally to wireless networks, and more particularly, embodiments of the subject matter relate to conserving energy consumed by mobile devices operating in a wireless network.

BACKGROUND

Mobile devices, such as cellular phones, smart phones, personal digital assistants, portable computers, digital media players, and the like, are typically powered by a battery (or another energy storage element) during mobile operation. It is desirable to minimize the power consumed by the mobile device to prolong the amount of time that the device may be operated before the battery needs to be recharged and/or replaced. The Universal Mobile Telecommunication System (UMTS) provides for a number of different operating states for mobile devices. Traditionally, the operating state of the mobile device is controlled by the network, which may result in the mobile device undesirably remaining in an operating state having higher power consumption even though the higher power consumption may not be needed to transmit and/or receive data.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
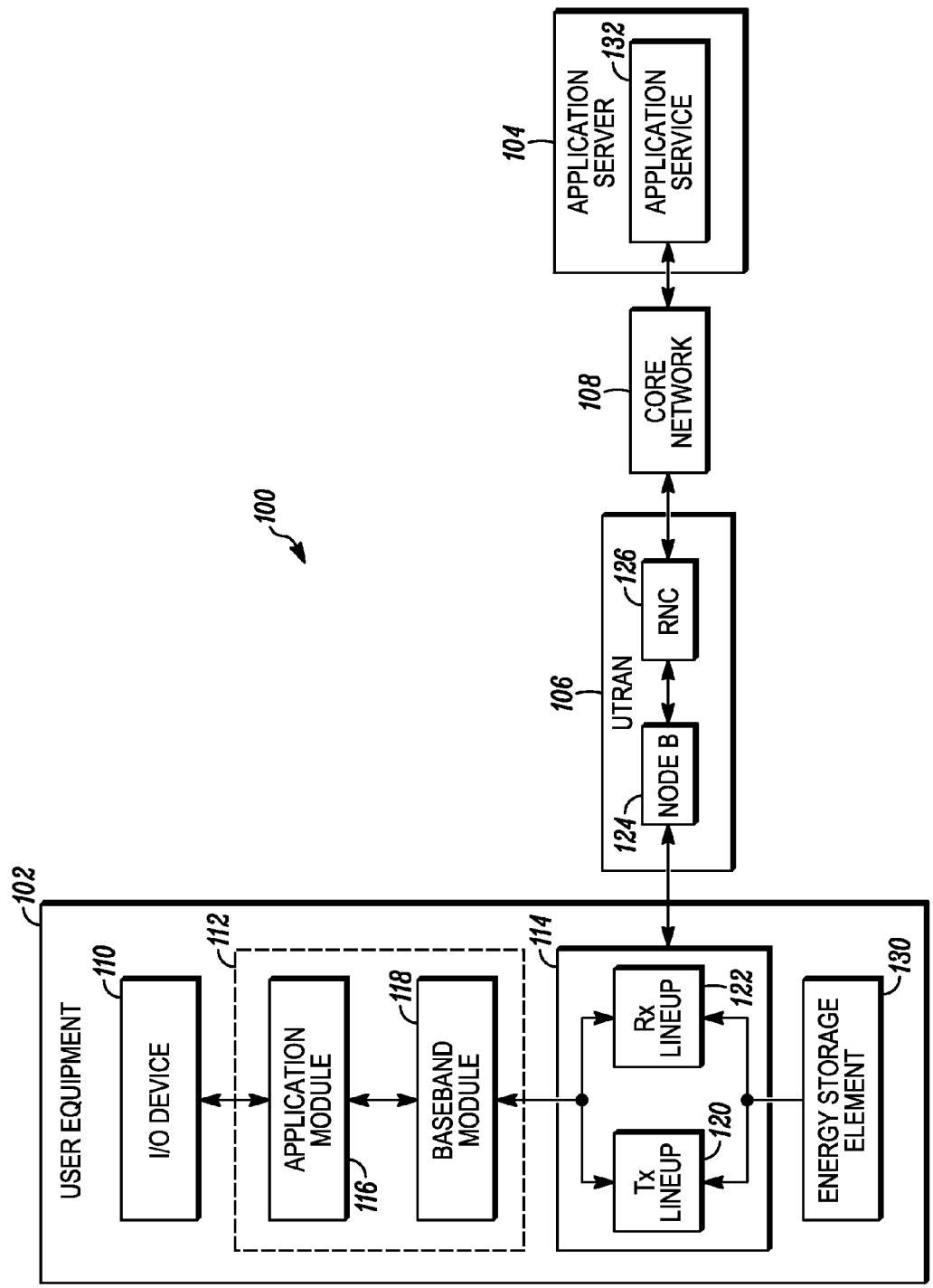
FIG. 1 is a block diagram of an exemplary network system in accordance with one embodiment.

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application. In addition, those skilled in the art will appreciate that embodiments may be practiced in conjunction with any number of network architectures, data transmission protocols, and mobile device configurations, and that the system described herein is merely one suitable example.

For the sake of brevity, conventional techniques related to wireless signal processing, wireless data transmission, persistent connections, signaling, network control, Universal Mobile Telecommunications System (UMTS) standards and protocols, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Technologies and/or concepts described herein related to systems and methods for saving energy in a mobile device during a persistent communication session, such as a persistent internet protocol (IP) connection, with an application server over a wireless network. In an exemplary embodiment, a lower level (e.g., a level beneath the application layer) of the protocol stack implemented by the mobile device is configured to detect a data traffic pattern that corresponds to data traffic for maintaining the persistent communication session (e.g., an exchange of heartbeat messages and acknowledgment messages) and automatically initiates a transition of the mobile device to a lower power state. As a result, the amount of time that the mobile device is operated in a higher power state is reduced, thereby conserving energy and extending battery life.

FIG. 1 depicts an exemplary network system 100 for communicating between a mobile device 102 and a server 104 over a wireless network 106. The network system 100 includes, without limitation, the mobile device 102, the wireless network 106, a core network 108, and the server 104. In an exemplary embodiment, the network system 100 is compliant with Universal Mobile Telecommunications System (UMTS) standards and protocols as defined by the third generation partnership project (3GPP). Accordingly, for convenience, but without limitation, the mobile device 102 may alternatively be referred to herein as user equipment (or UE) and the wireless network 106 may alternatively be referred to herein as a UMTS terrestrial radio access network (or UTRAN). It should be understood that FIG. 1 is a simplified representation of a network system 100 for purposes of explanation. A practical embodiment of the network system 100 may have any number of additional components configured to provide conventional functionality and/or features not described in detail herein.

Depending on the embodiment, the mobile device 102 may be realized as a mobile communications device (e.g., cellular phone, personal digital assistant, and the like), a computer (e.g., a laptop computer, a netbook computer, or the like), a portable media player (e.g., a digital audio player, a digital video player, or the like), a portable video game device, or another suitable electronic device. In an exemplary embodiment, the mobile device 102 includes an input/output device 110, a processing system 112, and a transceiver system 114. The I/O device 110 generally represents the hardware, firmware and/or software (or combination thereof) configured to interface between a user of the mobile device 102 and application software being executed by the processing system 112. In this regard, the I/O device 110 may be realized as a keypad, a keyboard, a mouse, a joystick, an audio input device (e.g., a microphone), an audio output device (e.g., a speaker), a display device, or another suitable I/O device 110. It should be appreciated that although FIG. 1 depicts a single I/O device 110, numerous I/O devices may be present in a practical embodiment of the mobile device 102.

The processing system 112 is coupled between the I/O device 110 and the transceiver system 114, and the processing system 112 generally represents the hardware, software, firmware, processing logic, and/or other components of the mobile device 102 that facilitates communications between the I/O device 110 and the transceiver system 114. In an exemplary embodiment, the processing system 112 includes an application module 116 and a baseband module 118. The application module 116 represents the hardware, firmware, processing logic, and/or other components configured to execute one or more applications (or application software). In an exemplary embodiment, the application module 116 executes application software (or an application daemon) that is configured to establish a persistent communication session with an application service 132 being executed by the application server 104, as described in greater detail below. Depending on the embodiment, the application module 116 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The baseband module 118 represents the hardware, firmware, processing logic, and/or other components configured to facilitate communications between the application module 116 and the transceiver system 114. Depending on the embodiment, the baseband module 118 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The transceiver system 114 generally represents the hardware and/or other components of the mobile device 102 configured to facilitate communications between the mobile device 102 and the wireless network 106. In an exemplary embodiment, the transceiver system 114 includes a transmitter arrangement 120 and a receiver arrangement 122. The transmitter arrangement 120 is coupled to the baseband module 118 and comprises a combination of components, such as, digital to analog converters (DACs), digital signal processing elements, multiplexers, mixers, filters, power amplifiers, antennas, and the like, which are suitably configured to generate an analog radio frequency (RF) signal for transmission to the wireless network 106 based on information received from the baseband module 118, as will be appreciated in the art. The receiver arrangement 122 is coupled to the baseband module 118 and comprises a combination of components, such as, analog-to-digital converters (ADCs), digital signal processing elements, multiplexers, mixers, filters, power amplifiers, antennas, and the like, which are suitably configured to demodulate and/or deconstruct an analog RF signal transmitted to the mobile device 102 from the wireless network 106 into a digital representation for processing at the baseband module 118, as will be appreciated in the art. As shown in FIG. 1, the mobile device 102 includes an energy storage element 130, such as a rechargeable battery, that is coupled to the transceiver system 114 and provides operating power to the transmitter arrangement 120 and the receiver arrangement 122.

As described in greater detail below, in an exemplary embodiment, in a UMTS system, the mobile device 102 is configured and operated in one of five possible operating states. In a CELL_DCH operating state, the transmitter arrangement 120 and the receiver arrangement 122 are both continuously operated and consuming power from the energy storage element 130. In a CELL_FACH operating state, only the receiver arrangement 122 is continuously operated, thereby consuming less power than when the mobile device 102 is in the CELL_DCH state. In a CELL_PCH operating state, the transmitter arrangement 120 is disabled while the receiver arrangement 122 is operated in a discontinuous mode to be able to receive overhead messaging. If a cell reselection occurs, the UE 102 will automatically enter or otherwise transition to the CELL_FACH state to execute a cell update procedure after which it returns back to CELL_PCH state if no other activity was triggered by the cell update procedure. In a URA_PCH operating state, the UE 102 behaves similar to the CELL_PCH state, except it does not execute a cell update procedure after every cell reselection, but instead executes a UTRAN registration area (URA) update procedure if the UTRAN registration area has changed. Since multiple cells can make up a UTRAN registration area, there is even less current consumed in URA_PCH as compared to CELL_PCH. In an idle operating state, neither the transmitter arrangement 120 nor the receiver arrangement 122 are continuously operated, thereby consuming the least amount of power from the energy storage element 130.

In an exemplary embodiment, the wireless network 106 includes at least one base station 124 and a network controller 126. The base station 124 includes RF transmitter(s) and receiver(s) configured to support communications to/from the mobile device 102 (e.g., transceiver system 114). The base station 124 is coupled to the network controller 126, and the network controller 126 is configured to perform various network and/or data traffic management functions, as will be appreciated in the art. As described above, in a UMTS system, the base station 124 may alternatively be referred to herein as Node B and the network controller 126 may alternatively be referred to herein as a radio network controller (or RNC). In this regard, the network controller 126 is coupled to the core network 108 and controls or otherwise manages the flow of information between the base station 124 and the core network 108. The core network 108 generally represents the networking components configured to support communication between the wireless network 106 and an application server 104.

In an exemplary embodiment, the application server 104 is coupled to the core network 108 and executes an application service 132 that provides data and/or content for transmission to the mobile device 102, as will be appreciated in the art. Depending on the embodiment, the application service 132 being executed by the application server 104 may be realized as an e-mail service (or mail service), a social network aggregator (or social network aggregation service), a weather feed, news feed, or sports feed service. As described in greater detail below, in an exemplary embodiment, the application service 132 being executed by the application server 104 is configured to support a persistent communication session with application software being executed by the mobile device 102.

Figure 2:
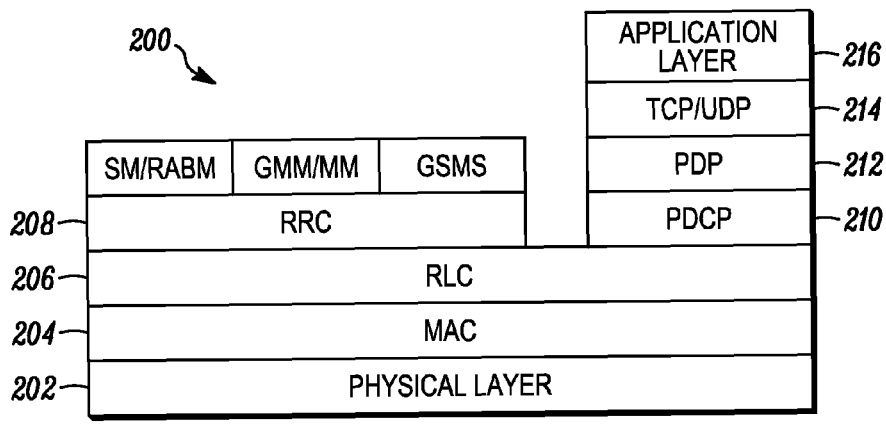
FIG. 2 is a block diagram of an exemplary Universal Mobile Telecommunications System (UMTS) protocol stack suitable for use with the network system of FIG. 1 in accordance with one embodiment.

Referring now to FIG. 2, in accordance with one or more embodiments, the mobile device 102 is configured to implement a UMTS protocol stack 200. Various implementation details of the UMTS protocol stack 200 are well known, and thus, will not be described in detail herein. The lowest layer of the UMTS protocol stack 200 comprises the physical layer 202 which represents the physical layer for communications between the UE 102 and the UTRAN 106 (e.g., between transceiver system 114 and base station 124). The media access control (MAC) layer 204 resides on the physical layer 202 and represents a sublayer of the data link layer that provides that provides mapping between logical channels and transport channels (e.g., transport channels sent across the physical air interface), along with transport format selection and traffic volume monitoring as requested by the radio resource control (RRC) layer 208. The radio link control (RLC) layer 206 resides on the MAC layer 204 and represents another sublayer of the data link layer that provides segmentation to and reassembly of data packets to/from the transport channels along with retransmission in error cases when operating in acknowledgment mode. As shown in FIG. 2, the user plane of the UMTS protocol stack 200 includes a packet data convergence protocol (PDCP) layer 210 which resides on the RLC layer 206 and provides header compression/decompression. The radio resource control (RRC) layer 208 resides on the RLC layer 206 in the control plane of the UMTS protocol stack 200 and controls the operating mode for the mobile device 102. In an exemplary embodiment, the MAC layer 204, the RLC layer 206, the RRC layer 208, and PDCP layer 210 are implemented by the baseband module 118 which performs all the formatting and processing required to facilitate transmission and/or receipt of data traffic between the wireless network 106 and the higher layers of the protocol stack implemented by the application module 116.

In an exemplary embodiment, the packed data protocol (PDP) layer 212 resides on the PDCP layer 210 and provides internet protocol (IP) processing and maintains the PDP context for a persistent communication session, as described in greater detail below. In this regard, the PDP context comprises the IP address and the international mobile subscriber identity (IMSI) of the UE 102 along with quality of service (QoS) settings. The transmission control protocol (TCP) layer 214 resides on the PDP layer 212 and maintains ordering of data traffic to/from an application layer 216 and provides guaranteed delivery to and transmission from the application layer 216 by retransmitting of packets controlled via timeouts. The application layer 216 resides on the TCP layer 214 and represents one or more applications being executed by the application module 116, as described above. In this regard, the application layer 216 represents at least the application software (or application daemon) being executed by the application module 116 that is configured to establish a persistent communication session with an application service 132 on the application server 104 and transmit and/or receive data from the physical layer 202. In an exemplary embodiment, the PDCP layer 210, the PDP layer 212, the TCP layer 214, and the application layer 216 are implemented by the application module 116 which executes the application software (e.g., application layer 216) and performs the required TCP/IP processing of data being sent by the application layer 216 to the baseband module 118 for transmission to the wireless network 106 and/or application server 104 and data being sent to the application layer 216 that was received by the baseband module 118 from the wireless network 106 and/or application server 104.

Figure 3:
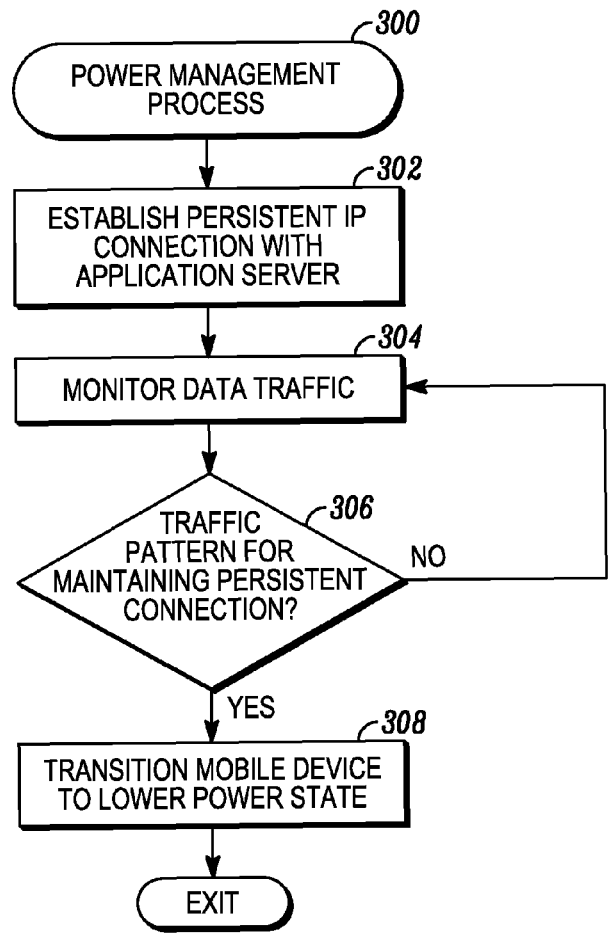
FIG. 3 is a flow diagram of a power management process suitable for use with the network system of FIG. 1 in accordance with one embodiment.

Referring now to FIG. 3, in an exemplary embodiment, a network system may be configured to perform a power management process 300 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the mobile device 102, the application server 104, the processing system 112, the transceiver system 114, the application module 116, the baseband module 118 and/or the network controller 126. It should be appreciated any number of additional or alternative tasks may be included, and may be incorporated into a more comprehensive procedure or process having additional functionality not described in detail herein.

Referring to FIG. 3, and with continued reference to FIG. 1 and FIG. 2, in an exemplary embodiment, the power management process 300 may be performed by a mobile device (e.g., mobile device 102) to save energy or otherwise conserve power during a persistent communication session with an application server (e.g., application server 104). In an exemplary embodiment, the power management process 300 begins by establishing, by the mobile device, a persistent communication session with an application service 132 on an application server over a wireless network (task 302). As used herein, a persistent communication session should be understood as a logical connection (e.g., an IP layer connection) between two devices configured to communicate over a network that remains open after an initial request is complete for handling any additional requests as opposed to a connection that is opened in response to a request and then closed after the request is completed. For example, in accordance with one embodiment, the application software (or application daemon) being executed by the application module 116 (e.g., application layer 216) may signal the baseband module 118 to establish a connection with the wireless network 106. For example, the user of the mobile device 102 may initiate the persistent communication session by providing input to the application via the I/O device 110 that causes the application software being executed by the application module 116 establish the persistent communication session. In an exemplary embodiment, the application module 116 establishes a persistent internet protocol (IP) connection, such as, for example, a persistent IP connection in accordance with hypertext transfer protocol (HTTP) version 1.1 request for comment (RFC) 2616, between the application software being executed by the application module 116 and the application service 132 executed by the application server 104 by providing configuration information (e.g., destination IP address, destination port, destination socket, IMSI, QoS settings, and the like) to the baseband module 118. In an exemplary embodiment, the baseband module 118 establishes an RRC connection between the mobile device 102 and the wireless network 106 by enabling the transmitter arrangement 120 and the receiver arrangement 122. In this regard, the baseband module 118 configures the mobile device 102 for a first operating state. For example, for a UMTS implementation, the baseband module 118 configures the mobile device 102 for a CELL_DCH state.

Once the baseband module 118 establishes a RF connection (e.g., physical layer 202) to the wireless network 106, a persistent communication session between the mobile device 102 and the application server 104 is established by transmitting information from the mobile device 102 to the wireless network 106 with the configuration information (e.g., destination IP address, destination port, destination socket, and the like) corresponding to the application service 132 and/or application server 104. In this regard, information from the application layer 216 (e.g., the application software being executed by the application module 116) may provide the data that is to be transmitted to the application service 132 and/or application server 104 to the PDP layer 212 which segments and/or adds TCP headers and IP headers to the data segments prior to providing the data to the baseband module 118. The IP header includes the IP address associated with the mobile device 102 and/or application layer 216 and the IP address associated with the application service 132 and/or application server 104, and the TCP header includes a port (or socket) associated with the application software (e.g., application layer 216) and a port associated with the application service 132 and/or application server 104. The data transmitted by the mobile device 102 is then routed by the wireless network 106 and/or core network 108 to the application server 104 in a conventional manner.

After the persistent communication session is established, the application software being executed by the mobile device 102 may transmit data to and/or receive data from the application service 132 being executed by the application server 104 via the wireless network 106. It will be appreciated in the art that in a UMTS system, when there is no longer data to be transmitted to/from the mobile device 102, the wireless network 106 may transition the mobile device 102 to various lower power operating states (e.g., a CELL_FACH state, a CELL_PCH state, a URA_PCH state, or an idle state) in a conventional manner. For example, the RNC 126 may provide a signal to the RRC layer 208 that causes the baseband module 118 to disable or otherwise cease providing operating power to the transmitter arrangement 120 and/or the receiver arrangement 122. In an exemplary embodiment, the mobile device 102 returns to an idle state when there is no longer data to be transmitted to/from the mobile device 102. The baseband module 118 configures the mobile device 102 for the idle state by disabling or otherwise ceasing operation of the transmitter arrangement 120 and the receiver arrangement 122.

In an exemplary embodiment, in the idle state, the baseband module 118 periodically operates or otherwise powers on the receiver arrangement 122 to check for messages at the wireless network 106 that are waiting to be delivered to the mobile device 102, such as, for example, a push notification from the application server 104. In response to the wireless network 106 transmitting a packet (or message) having a source IP address that matches the IP address for the persistent IP connection (i.e., a push notification message), the baseband module 118 configures the mobile device 102 to transmit and receive data from the wireless network 106. For example, in accordance with one embodiment, the baseband module 118 configures the mobile device 102 for a CELL_DCH state by powering on or otherwise enabling the transmitter arrangement 120 and receiver arrangement 122, thereby establishing an RRC connection to receive the push notification from the wireless network 106. The baseband module 118 provides or otherwise directs the push notification to the application software being executed by the application module 116 (e.g., application layer 216). In response to the push notification, the application software provides an acknowledgment message to the baseband module 118 for transmission to the application service 132 on the application server 104 over the wireless network 106, as will be appreciated in the art.

In an exemplary embodiment, the application software being executed by the application module 116 also provides a message (alternatively referred to as a heartbeat message or a keep-alive notification) to the baseband module 118 for transmission over the wireless network 106 to the application service 132 on the application server 104 in order to prevent the application service 132 from closing or otherwise terminating the persistent connection. For example, if the persistent communication session is configured to timeout after a predetermined period of time (e.g., thirty minutes), the application software may be configured to transmit a heartbeat message within the timeout period (e.g., at less than thirty minute intervals). In this regard, when the mobile device 102 is in the idle state, the application software on the application module 116 provides the heartbeat message to the baseband module 118 for transmission to the wireless network 106. In response to the heartbeat message, the baseband module 118 configures the mobile device 102 to transmit and receive data from the wireless network 106, for example, by configuring the mobile device 102 for a CELL_DCH state by powering on or otherwise enabling the transmitter arrangement 120 and receiver arrangement 122. In this manner, the baseband module 118 establishes an RRC connection for transmitting the heartbeat message to the wireless network 106. In response to receiving the heartbeat message, in an exemplary embodiment, the application service 132 on the application server 104 transmits an acknowledgment message back to the mobile device 102 over the wireless network 106.

In an exemplary embodiment, the power management process 300 monitors data traffic at the mobile device and detects or otherwise identifies a data traffic pattern that corresponds to a data traffic pattern for maintaining the persistent communication session (tasks 304, 306). In this regard, the mobile device 102 monitors the messages, packets and/or datagrams being transmitted to/from the mobile device 102 and determines when the pattern of the messages, packets and/or datagrams is indicative of communications intended to maintain the persistent communication session. In accordance with one embodiment, the PDCP layer 210 implemented by the baseband module 118 monitors packets (e.g., TCP/IP packets, IP datagrams, TCP segment packets, and the like) and/or other data transmitted and/or received by the mobile device 102 for packets and/or datagrams having configuration information corresponding to the persistent communication session. For example, the PDCP layer 210 may monitor the IP headers of packets transmitted and/or received by the mobile device for an IP header including a first IP address corresponding to the application layer 216 and a second IP address corresponding to the application service 132 and/or application server 104. In some embodiments, the PDCP layer 210 may monitor the TCP headers of packets transmitted and/or received by the mobile device 102 for a TCP port associated with the application service 132 and/or application server 104. In accordance with another embodiment, the PDCP layer 210 monitors the payload of packets transmitted and/or received by the mobile device 102 for a payload corresponding to a heartbeat message and/or a keep-alive notification. In an alternative embodiment, the PDP layer 212 implemented by the application module 116 may monitor packets transmitted and/or received by the mobile device 102 for packets indicative of a data traffic pattern for maintaining the persistent communication session (e.g., based on configuration information corresponding to the persistent communication session or payload corresponding to a heartbeat message and/or keep-alive notification), in a similar manner as described above in the context of the PDCP layer 210.

In accordance with one embodiment, the power management process 300 identifies a data traffic pattern for maintaining the persistent communication session in response to identifying a push notification message received by the mobile device 102 from the application server 104 followed by identifying an acknowledgment message transmitted or otherwise sent by the mobile device 102 on behalf of the application software to the application server 104 in response to the push notification message. For example, the PDCP layer 210 implemented by the baseband module 118 (or alternatively, the PDP layer 212 implemented by the application module 116) may determine or otherwise identify a packet received by the mobile device 102 as a push notification message from the application server 104 when the packet has configuration information matching the configuration information for the persistent communication session, for example, when the packet received by the mobile device 102 includes a source IP address and/or a source TCP port corresponding to the application service 132 and/or application server 104. In an exemplary embodiment, after identifying the push notification message from application server 104, the PDCP layer 210 monitors data sent by the application layer 216 and determines or otherwise identifies that a packet sent on behalf of the application layer 216 comprises an acknowledgment message sent by the application software in response to the push notification from the application server 104. For example, the PDCP layer 210 (or alternatively, the PDP layer 212) may determine or otherwise identify that the packet sent on behalf of the application layer 216 comprises an acknowledgment message when the packet includes configuration information (e.g., a destination IP address, a destination TCP port, or the like) that matches the configuration information associated with the application service 132 and/or application server 104. As described in greater detail below, in an exemplary embodiment, in response to detecting a data traffic pattern comprising a push notification message followed by an acknowledgment message, the power management process 300 automatically initiates a transition of the mobile device 102 to a lower power operating state (task 308).

In accordance with one embodiment, the power management process 300 identifies a data traffic pattern for maintaining the persistent communication session in response to identifying a acknowledgment message received by the mobile device 102 from the application server 104 in response to a heartbeat message (or keep-alive notification) transmitted or otherwise sent by the mobile device 102 to the application server 104. In this regard, the PDCP layer 210 (or alternatively, the PDP layer 212) determines or otherwise identifies that a packet sent on behalf of the application layer 216 comprises a heartbeat message sent by the application software when configuration information (e.g., a destination IP address, a destination TCP port, or the like) associated with the packet matches the configuration information associated with the application service 132 and/or application server 104. In an exemplary embodiment, after identifying the heartbeat message from application layer 216, the PDCP layer 210 monitors data received from by the mobile device 102 and determines or otherwise identifies that a packet received by the mobile device 102 comprises an acknowledgment message sent by the application service 132 and/or application server 104 in response to the heartbeat message from the application software being executed by the application module 116, for example, when packet received by the mobile device 102 has configuration information (e.g., a source IP address, a source TCP port, or the like) matching the configuration information for the application service 132 and/or application server 104. In accordance with one embodiment, the PDCP layer 210 identifies an acknowledgment message when an acknowledgment number in the TCP header of a packet received by the mobile device 102 matches a sequence number in the TCP header of the heartbeat message sent by the application layer 216.

In an exemplary embodiment, in response to detecting a data traffic pattern for maintaining the persistent communication session, the power management process 300 continues by automatically initiating a transition of the mobile device to a lower power operating state (task 308). In this regard, in response to a data traffic pattern for maintaining the persistent communication session (e.g., a heartbeat message followed by an acknowledgment message or a push notification message followed by an acknowledgment message) the PDCP layer 210 (or alternatively, the PDP layer 212) initiates a transition of the mobile device 102 to a lower power operating state independent of and/or without regard for the application software (e.g., application layer 216) being executed by the application module 116. In an exemplary embodiment, the PDCP layer 210 (or alternatively, the PDP layer 212) automatically initiates the transition of the mobile device 102 to the lower power operating state by signaling the RRC layer 208 and/or baseband module 118 to transmit a signaling connection release indication message to the wireless network 106. For example, in accordance with one embodiment, the baseband module 118 automatically transmits a signaling connection release indication message to the RNC 126 in accordance with the third generation partnership project (3GPP) technical specification (TS) 25.331 version 9.0 to initiate the transition of the mobile device 102 to a lower power operating state. In an exemplary embodiment, the wireless network 106 and/or RNC 126 is configured to send an acknowledgment message in response to the signaling connection release indication message, wherein in response to receiving the acknowledgement message from the wireless network 106, the baseband module 118 configures the mobile device 102 for an idle state. In this regard, the baseband module 118 configures the mobile device 102 for an idle state by disabling or otherwise ceasing operation of the transmitter arrangement 120 and receiver arrangement 122, for example, by signaling the transmitter arrangement 120 and/or receiver arrangement 122 to stop operating. In alternative embodiments, the baseband module 118 may configure the mobile device 102 for another lower power operating state (e.g., a CELL_FACH state, a CELL_PCH state, or a URA_PCH state) instead of an idle state in response to the acknowledgment message.

To briefly summarize, the methods and systems described above reduce the amount of energy consumed by a mobile device during a persistent communication session by reducing the amount of time during which the mobile device is in higher power operating states (e.g., CELL_DCH or CELL_FACH). After detecting a data traffic pattern at the mobile device that corresponds to a data traffic pattern for maintaining the persistent communication session, the mobile device automatically initiates a transition to a lower power operating state, rather than waiting for the network and/or application software to initiate the transition to a lower power operating state. Thus, the power consumed by the mobile device during a persistent communication session is reduced, thereby extending the length of time the mobile device may be operated before its battery needs to be recharged and/or replaced.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of saving energy in a mobile device configured to maintain a persistent communication session with an application server over a wireless network, the method comprising:
   detecting a traffic pattern between the mobile device and the application server for maintaining the persistent communication session; and
   automatically initiating a transition of the mobile device from a first operating state to a second operating state in response to detecting the traffic pattern, wherein power consumption associated with the second operating state is less than power consumption associated with the first operating state.

2. The method of claim 1, the persistent communication session comprising persistent internet protocol (IP) connection, wherein detecting the traffic pattern comprises identifying an acknowledgment message sent by the mobile device to the application server in response to the mobile device receiving a push notification from the application server.

3. The method of claim 1, the persistent communication session comprising persistent internet protocol (IP) connection, wherein detecting the traffic pattern comprises identifying an acknowledgment message received by the mobile device in response to the mobile device sending a keep-alive notification to the application server.

4. The method of claim 1, the persistent communication session comprising persistent internet protocol (IP) connection, the persistent IP connection having configuration information associated therewith, wherein detecting the traffic pattern comprises determining a first packet received by the mobile device has configuration information matching the configuration information for the persistent IP connection.

5. The method of claim 1, the persistent communication session comprising persistent internet protocol (IP) connection, the persistent IP connection having configuration information associated therewith, wherein detecting the traffic pattern comprises determining a first packet sent by the mobile device has configuration information matching the configuration information for the persistent IP connection.

6. The method of claim 1, the persistent communication session comprising persistent internet protocol (IP) connection, wherein detecting the traffic pattern comprises identifying a packet having an IP address associated with the application server.

7. The method of claim 6, wherein the packet is selected from the group consisting of a TCP/IP packet, an IP datagram, and a TCP segment.

8. The method of claim 1, wherein automatically initiating the transition to the second operating state comprises transmitting a signaling connection release indication to the wireless network.

9. The method of claim 8, the wireless network being configured to send an acknowledgment message in response to the signaling connection release indication, wherein the method further comprises configuring the mobile device for the second operating state in response to receiving the acknowledgment message.

10. The method of claim 9, the mobile device including a transmitter arrangement and a receiver arrangement, wherein configuring the mobile device for the second operating state comprises disabling at least one of the transmitter arrangement and the receiver arrangement.

11. The method of claim 1, the first operating state comprising a CELL_DCH state, wherein automatically initiating the transition to the second operating state comprises configuring the mobile device for an operating state selected from the group consisting of a CELL_FACH state, a CELL_PCH state, a URA_PCH state, and an idle state.

12. The method of claim 1, wherein automatically initiating comprises automatically initiating the transition of the mobile device from the first operating state to the second operating state independent of application software being executed by the mobile device.

13. A method of saving energy in a mobile device configured to maintain a persistent communication session with an application server over a wireless network, the persistent communication session comprising a persistent internet protocol (IP) connection, the method comprising:
    detecting a traffic pattern between the mobile device and the application server corresponding to data traffic for maintaining the persistent IP connection; and
    automatically initiating a transition of the mobile device from a CELL_DCH state to a lower power state in response to detecting the traffic pattern, the lower power state comprising a CELL_FACH state, a CELL_PCH state, a URA_PCH state, or an idle state.

14. A method of saving energy in a mobile device configured to maintain a persistent communication session with an application server over a wireless network, the mobile device implementing a protocol stack including a packet data convergence protocol (PDCP) layer residing on a radio link control (RLC) layer, the method comprising:
    detecting, by the PDCP layer, a traffic pattern between the mobile device and the application server for maintaining the persistent communication session; and
    automatically initiating, by the PDCP layer, a transition of the mobile device from a first operating state to a second operating state in response to detecting the traffic pattern, wherein power consumption associated with the second operating state is less than power consumption associated with the first operating state.

15. The method of claim 14, the protocol stack including an application layer, wherein detecting the traffic pattern comprises identifying, by the PDCP layer, a packet sent on behalf of the application layer comprises an acknowledgement message when the packet includes configuration information matching configuration information associated with an application service executed by the application server.

16. The method of claim 15, wherein detecting the traffic pattern comprises identifying, by the PDCP layer, the packet sent on behalf of the application layer comprises an acknowledgement message after identifying a second packet received by the mobile device comprises a push notification when the second packet includes the configuration information associated with the application service.

17. The method of claim 14, wherein detecting the traffic pattern comprises identifying, by the PDCP layer, a packet received by the mobile device comprises an acknowledgement message when the packet includes configuration information matching configuration information associated with an application service executed by the application server.

18. The method of claim 17, the protocol stack including an application layer, wherein detecting the traffic pattern comprises identifying, by the PDCP layer, the packet received by the mobile device comprises an acknowledgement message after identifying a second packet sent on behalf of the application layer comprises a heartbeat message when the second packet includes the configuration information associated with the application service.

19. The method of claim 18, further comprising identifying the packet received by the mobile device comprises an acknowledgement message when an acknowledgement number in a header of the packet matches a sequence number in a header of the second packet.

20. The method of claim 14, the protocol stack including an application layer, wherein the PDCP layer automatically initiates the transition of the mobile device from the first operating state to the second operating state independent of the application layer by:

- signaling a radio resource control (RRC) layer residing on the RLC layer to transmit a signaling connection release indication message to a wireless network, the wireless network including a network controller configured to send an acknowledgement message in response to the signaling connection release indication message; and
- configuring the mobile device for an idle state in response to receiving the acknowledgement message from the wireless network.

* * * * *